United States Patent
Lin et al.

(10) Patent No.: US 8,520,176 B2
(45) Date of Patent: Aug. 27, 2013

(54) STEREOSCOPIC DISPLAY MODULE, METHOD FOR MANUFACTURING THE SAME AND MANUFACTURING SYSTEM THEREOF

(75) Inventors: Lang-Chin Lin, Hsinchu (TW); Chun-Jung Chen, Hsinchu County (TW); Chao-Hsu Tsai, Hsinchu (TW); Tzuan-Ren Jeng, Hsinchu (TW); Golden Tiao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 51 days.

(21) Appl. No.: 13/363,388

(22) Filed: Feb. 1, 2012

(65) Prior Publication Data

US 2012/0194752 A1    Aug. 2, 2012

Related U.S. Application Data

(60) Provisional application No. 61/438,262, filed on Feb. 1, 2011.

(30) Foreign Application Priority Data

Oct. 26, 2011   (TW) .............................. 100138921 A

(51) Int. Cl.
*G02F 1/1335*   (2006.01)
(52) U.S. Cl.
USPC ................................ 349/117; 349/8; 349/181
(58) Field of Classification Search
USPC ........................................... 349/15, 117, 181
See application file for complete search history.

(56) References Cited

U.S. PATENT DOCUMENTS

| | | | |
|---|---|---|---|
| 5,327,285 | A | 7/1994 | Faris |
| 5,837,169 | A | 11/1998 | Rourke |
| 6,055,103 | A | 4/2000 | Woodgate et al. |
| 6,384,971 | B1 | 5/2002 | Faris |
| 6,498,679 | B2 | 12/2002 | Lee et al. |
| 7,841,847 | B2 | 11/2010 | Tsai et al. |

FOREIGN PATENT DOCUMENTS

| | | |
|---|---|---|
| CN | 101819328 | 9/2010 |
| TW | 473654 | 1/2002 |
| TW | 200931062 | 7/2009 |

OTHER PUBLICATIONS

Langchin Lin et al., "A method of fabricating micro-retarder plates by a laser system", IS&T/SPIE Symposium on electronic imaging: science and technology, Jan. 29, 2008, p. 1-p. 10.
Ying-Chi Chen et al., "Fabrication of Polymeric Microretardation Film Using Thermal Printing Technology", IDMC/3DSA/Asia Display, Apr. 27, 2009, p. 1-p. 4.
Ying-Chi Chen et al., "Fabrication of Microretarder Film Using Indirect Laser Heating", IDMC/3DSA/Asia Display, Apr. 27, 2009, p. 1-p. 4.
Chi-Lin Wu et al., "An Autostereoscopic 2D/3D Display Using Microretarder", International Display Research Conference/International Meeting on Information Display, Oct. 13, 2010, p. 1-p. 2.

*Primary Examiner* — Phu Vu
(74) *Attorney, Agent, or Firm* — Jianq Chyun IP Office

(57) ABSTRACT

A method for manufacturing a stereoscopic display module including following steps is provided. A display module is provided. A first retardation film is attached on the display module with a heat-resisting adhesive layer. After attaching the first retardation film on the display module with the heat-resisting adhesive layer, a partial region of the first retardation film is heated to vanish a phase retardation property. The partial region includes a plurality of sub-regions spaced at intervals. A stereoscopic display module and a manufacturing system thereof are also provided.

37 Claims, 7 Drawing Sheets

STEREOSCOPIC DISPLAY MODULE, METHOD FOR MANUFACTURING THE SAME AND MANUFACTURING SYSTEM THEREOF

CROSS-REFERENCE TO RELATED APPLICATION

This application claims the priority benefits of Taiwan application serial no. 100138921, filed on Oct. 26, 2011 and U.S. application Ser. No. 61/438,262, filed on Feb. 1, 2011. The entirety of each of the above-mentioned patent application is hereby incorporated by reference herein and made a part of this specification.

BACKGROUND

1. Technical Field

The disclosure relates to a stereoscopic display module, a method for manufacturing the same, and a manufacturing system thereof.

2. Related Art

With development of display technology, displays having better image quality, richer color performance and better performance effect are continuously developed. In recent years, a stereoscopic display technique has extended from cinema applications to home display applications. Since a key technique of the stereoscopic display technology is to ensure a left eye and a right eye of a user to respectively view left-eye images and right-eye images of different viewing angles, according to a conventional glasses-type stereoscopic display technique, the user generally wears a special pair of glasses to filter the left-eye images and the right-eye images.

The glasses-type stereoscopic display technique comprises active type stereoscopic display techniques and passive type stereoscopic display techniques. One of the active type stereoscopic display techniques is to use a display to alternately display the left-eye images and the right-eye images, and a user wears a pair of glasses having liquid crystal shutters. The liquid crystal shutter disposed at the left eye and the liquid crystal shutter disposed at the right eye are alternately opened, so that the left eye and the right eye of the user respectively receive the left-eye images and the right-eye images to produce stereoscopic images in the brain. However, cost of the liquid crystal shutters used in the active type stereoscopic display technique is relatively high, and power has to be supplied to the liquid crystal shutters. Moreover, in order to synchronize switching of the left-eye image and the right-eye image of the stereoscopic display and the time for opening and closing the liquid crystal shutters, the cost of the stereoscopic display and the glasses is increased, and the cost increase adversely influences popularisation of the stereoscopic display.

One of the passive type stereoscopic display techniques is to attach a micro-retarder on the display. The micro-retarder may divide an image into two images with different polarization directions, and the glasses worn by the user comprises two polarizers of different polarization directions, so as to filter the two images with different polarization directions. Since the polarizers used in the passive type stereoscopic display technique is cheaper than the liquid crystal shutters used in the active type stereoscopic display technique, and the glasses used in the passive type stereoscopic display technique is unnecessary to be powered and is unnecessary to perform synchronous switching according to the displayed images, the cost of the passive type stereoscopic display is cheaper, which is liable to be accepted by consumers. In this way, the stereoscopic display technique is easy to extend to home applications.

SUMMARY

An embodiment of the disclosure provides a method for manufacturing a stereoscopic display module, which comprises following steps. A display module is provided. A first retardation film is attached on the display module with a heat-resisting adhesive layer. After attaching the first retardation film on the display module with the heat-resisting adhesive layer, a partial region of the first retardation film is heated to vanish a phase retardation property of the partial region, where the partial region comprises a plurality of sub-regions spaced at intervals.

Another embodiment of the disclosure provides a stereoscopic display module comprising a display module, a patterned retardation film and a heat-resisting adhesive layer. The patterned retardation film is disposed on the display module, where the patterned retardation film comprises a plurality of retardation regions and a plurality of transparent regions, and the retardation regions and the transparent regions are disposed in alternation. The heat-resisting adhesive layer is disposed between the display module and the patterned retardation film, so as to attach the patterned retardation film on the display module.

An embodiment of the disclosure provides a manufacturing system of a stereoscopic display module, which is configured to manufacture a display module into the stereoscopic display module. The manufacturing system of the stereoscopic display module comprises a displacement control carrier platform, a heating device, an alignment device and a control unit. The displacement control carrier platform is configured to carry and move the display module. The heating device is configured to heat a retardation film attached on the display module. The alignment device is configured to align the display module and the heating device. The control unit controls a relative position of the displacement control carrier platform and the heating device to cause the heating device to heat a partial region of the retardation film, where the partial region comprises a plurality of sub-regions spaced at intervals.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
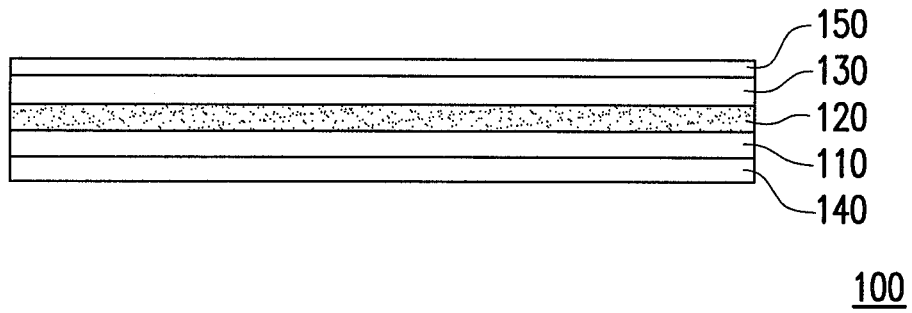
FIG. 1A to FIG. 1D are schematic diagrams of a flow of a method for manufacturing a stereoscopic display module according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1B:
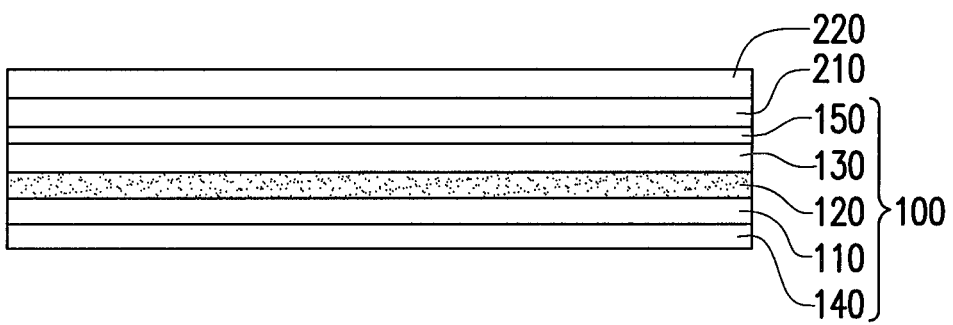
Figure 1C:
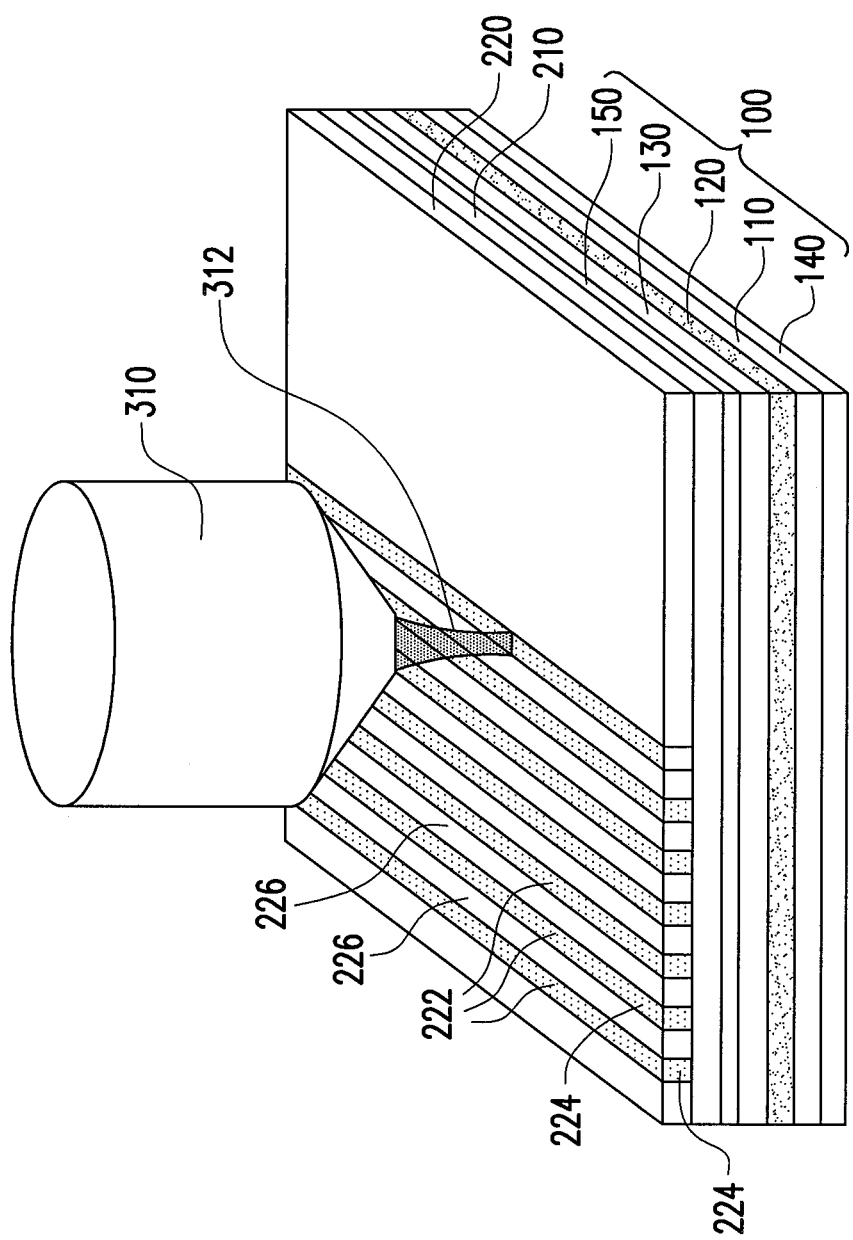
Figure 1D:
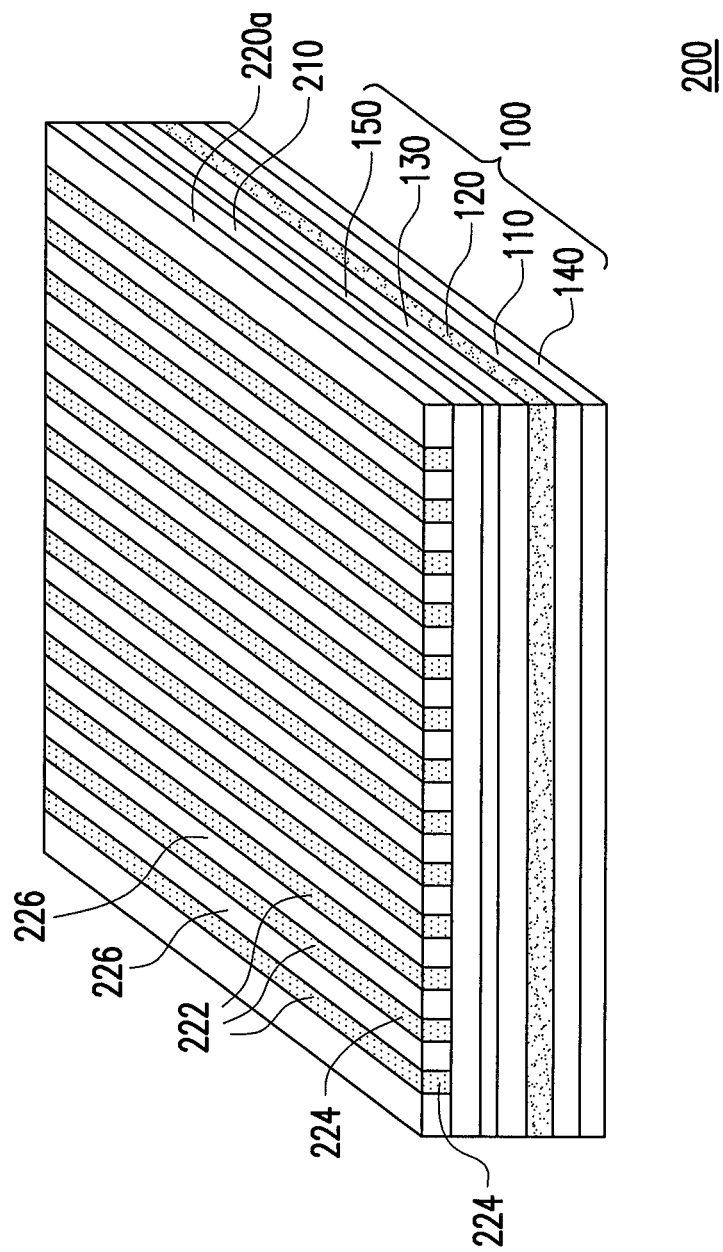

FIG. 1A to FIG. 1D are schematic diagrams of a flow of a method for manufacturing a stereoscopic display module according to an exemplary embodiment, where FIG. 1A and FIG. 1B are cross-sectional views, and FIG. 1C and FIG. 1D are three-dimensional views. The method for manufacturing the stereoscopic display module comprises following steps. First, referring to FIG. 1A, a display module 100 is provided, and the display module 100 is, for example, a general display module configured to display two-dimensional images. In the present embodiment, the display module 100 is a liquid crystal display (LCD) panel. In detail, the display module 100 may comprise a first substrate 110, a liquid crystal layer 120, a second substrate 130, a first polarizing film 140 and a second polarizing film 150, where the first substrate 110 is an active matrix substrate, the liquid crystal layer 120 is disposed between the first substrate 110 and the second substrate 130, the first substrate 110 is disposed between the first polarizing film 140 and the liquid crystal layer 120, and the second substrate 130 is disposed between the second polarizing film 150 and the liquid crystal layer 120. In the present embodiment, the first polarizing film 140 is attached on the first substrate 110, and the second polarizing film 150 is attached on the second substrate 130. The first substrate 110 is, for example, a thin film transistor array substrate with a plurality of pixel structures. The second substrate 130 is, for example, a color filter array substrate. However, in other embodiments, the display module can also be a plasma display panel (PDP), an organic light-emitting diode panel (OLED panel), or other suitable display module attached with a polarizing film on the screen thereof.

Then, referring to FIG. 1B, a first retardation film 220 is attached on the display module 100 with a heat-resisting adhesive layer 210. In detail, the first retardation film 220 can be attached on the second polarizing film 150 of the display module 100. However, in another embodiment, the display module 100 can be placed upside down, and the first retardation film 220 is attached on the first polarizing film 140 with the heat-resisting adhesive layer 210, and now the first polarizing film 140 is located between the first substrate 110 and the first retardation film 220, and the heat-resisting adhesive layer 210 is located between the first polarizing film 140 and the first retardation film 220. In the present embodiment, a heat-resisting temperature of the heat-resisting adhesive layer 210 is greater than or equal to 80 degrees centigrade. For example, the heat-resisting adhesive layer 210 is, for example, a no-substrate double-sided adhesive, and a material of the heat-resisting adhesive layer 210 is, for example, a no-substrate optical adhesive. Moreover, in the present embodiment, a thickness of the heat-resisting adhesive layer 210 is greater than 30 μm. In addition, in the present embodiment, when the heat-resisting adhesive layer 210 is cured, it substantially presents a transparent status, and is pervious to light. Moreover, the first retardation film 220 is, for example, a half-wavelength retardation film, i.e. a half-wave plate.

Then, referring to FIG. 1C, after attaching the first retardation film 220 on the display module 100 with the heat-resisting adhesive layer 210, a partial region 222 of the first retardation film 220 is heated to vanish the phase retardation property of the partial region 222, where the partial region 222 comprises a plurality of sub-regions 224 spaced at intervals. In the present embodiment, the sub-regions 224 are stripe-shaped. The first retardation film 220 may contain a birefringence material, which has two refractive indexes respectively along a fast axis and a slow axis, and the phase retardation thereof relates to a wavelength of an incident light and a thickness of the birefringence material, so that the first retardation film 220 has the phase retardation property. When the partial region 222 of the first retardation film 220 is heated, the phase retardation property of the birefringence material disappears, and the partial region 222 loses the phase retardation effect.

In the present embodiment, heating the partial region 222 of the first retardation film 220 comprises heating the partial region 222 with a laser beam 312. However, in other embodiments, heating the partial region 222 of the first retardation film 220 may comprise hot embossing the partial region 222, heating the partial region 222 with a heating wire or any heating method capable of vanishing the phase retardation property of the partial region 222.

After heating of the partial region 222 is completed, the first retardation film 220 is patterned to from a patterned retardation film 220a as that shown in FIG. 1D, so as to form a stereoscopic display module 200 shown in FIG. 1D. The stereoscopic display module 200 comprises the display module 100, the patterned retardation film 220a and the heat-resisting adhesive layer 210. The patterned retardation film 220a is disposed on the display module 100, where the patterned retardation film 220a comprises a plurality of retardation regions 226 and a plurality of transparent regions, where the transparent regions are the heated sub-regions 224, and the retardation regions 226 are formed by the un-heated regions of the first retardation film 220. The retardation regions 226 and the transparent regions are disposed in alternation. In other words, in the present embodiment, the patterned phase retardation film 220a is a micro retardation film. The heat-resisting adhesive layer 210 is disposed between the display module 100 and the patterned phase retardation film 220a, so as to attach the patterned phase retardation film 220a on the display module 100.

In another embodiment, if the first retardation film 220 is attached on the first polarizing film 140 with the heat-resisting adhesive layer 210 in a fabrication process, the patterned retardation film 220a is attached on the first polarizing film 140 with the heat-resisting adhesive layer 210, i.e. the first polarizing film 140 is located between the first substrate 110 and the patterned retardation film 220a, and the heat-resisting adhesive layer 210 is located between the first polarizing film 140 and the patterned retardation film 220a.

When a backlight source is disposed at a side of the stereoscopic display module 200 (for example, a side close to the first polarizing film 140, i.e. a downside of FIG. 1A), a light emitted from the backlight source sequentially passes through the first polarizing film 140, the first substrate 110, the liquid crystal layer 120, the second substrate 130 and the second polarizing film 150, so that the light emitted from the display module 100 is a polarized light, for example, a linear polarized light. A part of the light emitted from the display module 100 passes through the transparent regions (i.e. the heated sub-regions 224), and since the transparent region does not have the phase retardation property, this part of the light still maintains an original polarization state. On the other hand, the other part of the light emitted from the display module 100 passes through the retardation regions 226, and the retardation region 226 changes the polarization state of the other part of the light. For example, the retardation region 226 is, for example, a half-wavelength retardation region, and when the light emitted from the display module 100 is the linear polarized light, the retardation region 226 rotates a linear polarization direction of the light by 90 degrees. In this way, the linear polarization direction of the light passing through the transparent regions and the linear polarization direction of the light passing through the retardation regions 226 have a phase difference of 90 degrees. When the user wears polarization glasses, and transmission axis directions of two polarizers of the polarization glasses have a phase difference of 90 degrees and respectively correspond to the linear polarization direction of the light passing through the transparent regions and the linear polarization direction of the light passing through the retardation regions 226, one of a left eye and a right eye of the user may view images carried by the light passing through the transparent regions, and the other one of the left eye and the right eye of the user may view images carried by the light passing through the retardation regions 226, so that stereoscopic images are produced in user's brain.

In the method for manufacturing the stereoscopic display module 200, since the first retardation film 220 is first attached to the display module 100 and is aligned to a pixel image (for example, aligned to a red, green or blue sub pixel image) of the display module 100 through image sensors 340 (referring to FIG. 2), and then the first retardation film 220 is heated for patterning, the transparent regions and the retardation regions 226 of the patterned retardation film 220a fabricated from the first retardation film 220 have been aligned to the pixels of the display module 100. In other words, while the first retardation film 220 is heated to form the patterned retardation film 220a, the transparent regions and the retardation regions 226 of the patterned retardation film 220a are self-aligned to the pixels of the display module 100. In this way, a subsequent packaging step of the method for manufacturing the stereoscopic display module 200 is unnecessary, so that the method for manufacturing the stereoscopic display module 200 is simplified. Moreover, by self-aligning the transparent regions and the retardation regions 226 to the pixels of the display module 100, position errors of the transparent regions and the retardation regions 226 relative to the pixels are effectively reduced. Comparatively, if the first retardation film 220 is first heated to form the patterned retardation film 220a, and then the patterned retardation film 220a is attached on the display module 100, alignment accuracy of the transparent regions and the retardation regions 226 relative to the pixels of the display module 100 is generally reduced due to attachment error, and a precise alignment system is required to assist packaging the display module 100 and the patterned retardation film 220a.

On the other hand, since the first retardation film 220 is attached on the display module 100 through the heat-resisting adhesive layer 210, when the first retardation film 220 is heated, the heat-resisting adhesive layer 210 still maintains stable, which prevents the first retardation film 220 from falling off from the display module 100.

Moreover, since the stereoscopic display module 200 has the heat-resisting adhesive layer 210, alignment of the display module 100 and the patterned retardation film 220a in the stereoscopic display module 200 can be more accurate, which avails improving display quality of the stereoscopic display module 200.

In the present embodiment, a backlight module can be disposed at the downside (i.e. the side close to the first polarizing film 140) to provide a backlight source to the stereoscopic display module 200. Therefore, the stereoscopic display module 200 and the backlight module form a stereoscopic display. However, when the stereoscopic display module 200 does not have the liquid crystal display (LCD) panel, but have a self luminous display module such as a plasma display panel (PDP) or an organic light-emitting diode panel (OLED panel) attached with a polarizing film on the screen thereof, it is unnecessary to dispose the backlight module under the stereoscopic display module 200.

Figure 2:
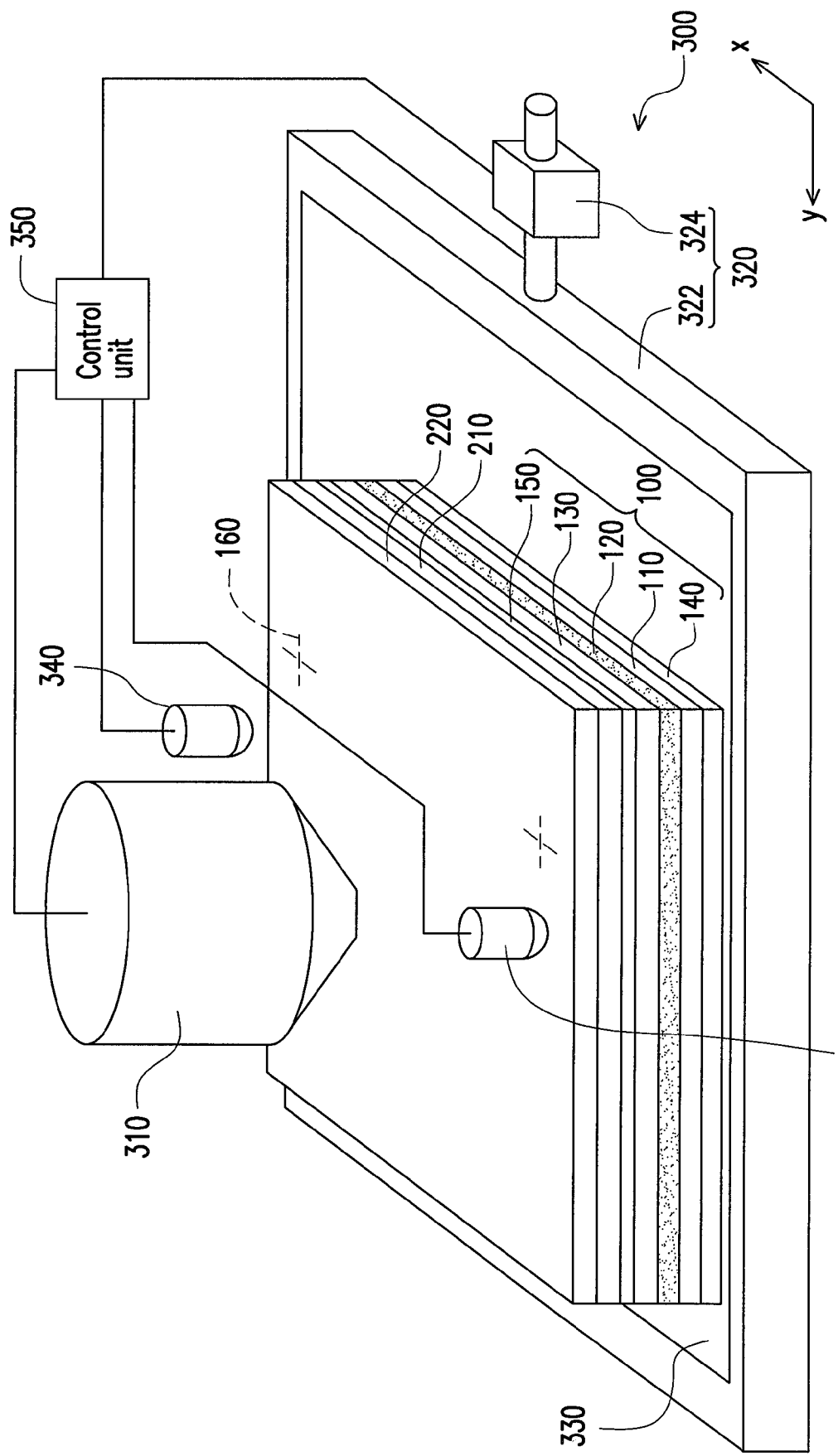
FIG. 2 is a schematic diagram of one of steps of a method for manufacturing a stereoscopic display module according to an exemplary embodiment.

FIG. 2 is a schematic diagram of one of steps of a method for manufacturing a stereoscopic display module according to an exemplary embodiment. Referring to FIG. 2, in the present embodiment, before the partial region 222 of the first retardation film 220 is heated, and after the first retardation film 220 is attached on the display module 100 with the heat-resisting adhesive layer 210, i.e. between the steps shown in FIG. 1B and FIG. 1C, the display module 100 and a heating device 310 are aligned, where the heating device 310 is configured to heat the partial region 222. In the present embodiment, the heating device 310 is, for example, a laser generator, which is configured to produce the laser beam 312. The laser generator is, for example, a gas laser generator, a solid-state laser generator, or other suitable laser generators. In other embodiments, the heating device can also be a hot embossing device, which is used for hot embossing the partial region 222. Alternatively, the heating device can also be a heating wire, which is used for heating the partial region 222.

Moreover, in the present embodiment, before the display module 100 and the heating device 310 are aligned, and after the first retardation film 220 is attached on the display module 100 with the heat-resisting adhesive layer 210, the display module 100 is roughly fixed on a displacement control carrier platform 320.

In the present embodiment, aligning the display module 100 and the heating device 310 comprises following steps. First, a light source 330 is provided to light the display module 100. In the present embodiment, the light source 330 is, for example, a planar light source for providing a backlight to the display module 100. Then, the display module 100 is positioned by at least one image sensor 340. The image sensors 340 can sense an image of the display module 100, for example, sense a pixel image of the display module 100, and particularly, the image sensor 340 senses the red, green or blue sub pixel image of the display module 100. In the present embodiment, the image sensor 340 is, for example, a charge coupled device (CCD), and a lens having an image enlargement function is disposed in front of the CCD to enlarge the image of the display module 100 for imaging on the CCD. In other embodiments, a complementary metal oxide semiconductor (CMOS) sensor or other image sensors can replace the CCD. For example, the image sensors 340 and the light source 330 can be respectively disposed at two opposite sides of the display module 100, so that when the light source 330 is turned on, the image sensors 340 easily detect a pixel structure of the display module 100, and accordingly position the display module 100 according to the pixel structure. Alternatively, in another embodiment, at least one alignment mark 160 (two alignment marks are illustrated in FIG. 2) of the display module 100 can be used to align the display module 100 and the heating device 310. In other words, the image sensors 340 sense the alignment marks 160, and position the display module 100 according to the alignment marks. In other embodiments, the alignment marks 160 can be disposed at four corners of the display module 100 for aligning the display module 100 and the heating device 310. In the present embodiment, at least two locations on the display module 100 are positioned by the image sensors 340, for example, the two image sensors 340 shown in FIG. 2 are configured to respectively position two locations on the display module 100, i.e. two locations of a left end and a right end of the display module 100. However, in other embodiments, the image sensors 340 can also position three locations on the display module 100, for example, position the left end, the right end and a top end (at the left side of FIG. 2) of the display module 100, or position the left end, the right end and a lower end (at the right side of FIG. 2) of the display module 100. Alternatively, the image sensors 340 can also position four or more positions on the display module 100.

In the present embodiment, a control unit 350 can be configured to control a positioning process of the display module 100. The control unit 350 is electrically connected to the heating device 310, the image sensors 340 and the displacement control carrier platform 320. In the present embodiment, the displacement control carrier platform 320 comprises a carrier platform 322 and an actuator 324. The actuator 324 is connected to the carrier platform 322, and drives the carrier platform 322 to move. Moreover, in the present embodiment, the control unit 350 is electrically connected to the actuator 324. In the present embodiment, the heating device 310 scans along a first direction (for example, an x-direction shown in FIG. 2), and the actuator 324 drives the carrier platform 322 to move along a second direction (for example, a y-direction shown in FIG. 2), where the first direction (the x-direction) is substantially perpendicular to the second direction (the y-direction). However, in other embodiments, the heating device 310 can also scan along the first direction and can move along the second direction, and the carrier platform 322 maintains still. Alternatively, the heating device 310 maintains still, and the carrier platform 322 moves along the first direction and the second direction. In the present embodiment, the control unit 350 controls a moving speed and a moving amount of the carrier platform 322, so that the method for manufacturing the stereoscopic display module of the embodiment can be adapted to manufacture the stereoscopic display modules of various sizes.

In the present embodiment, aligning the display module 100 and the heating device 310 comprises feeding back signals generated by the image sensors 340 to the displacement control carrier platform 320, so that the displacement control carrier platform 320 moves according to the signals, so as to align the display module 100 and the heating device 310. For example, the control unit 350 moves the displacement control carrier platform 320 according to image signals transmitted by the image sensors 340. In detail, the control unit 350 determines a position of the display module 100 according the signals transmitted by the image sensors 340, and accordingly moves the displacement control carrier platform 320 to align the display module 100 and the heating device 310. In detail, the control unit 350 sends a control signal to the actuator 324 of the displacement control carrier platform 320, so as to control the actuator 324 to drive the carrier platform 322 to a suitable position.

In the present embodiment, the method for manufacturing the stereoscopic display module can be implemented through a manufacturing system 300 of the stereoscopic display module. The manufacturing system 300 is configured to manufacture the display module 100 into the stereoscopic display module 200. The manufacturing system 300 comprises the displacement control carrier platform 320, the heating device 310, alignment devices (which are, for example, the image sensors 340 in the present embodiment) and the control unit 350. The displacement control carrier platform 320 is configured to carry and move the display module 100. The heating device 310 is configured to heat the first retardation film 220 attached on the display module 100. The alignment devices (for example, the image sensors 340) are configured to align the display module 100 and the heating device 310. The control unit 350 controls a relative position of the displacement control carrier platform 320 and the heating device 310 to cause the heating device 310 to heat the partial region 222 of the first retardation film 220.

In the present embodiment, since the heating device 310 and the display module 100 are first aligned before the heating device heats the partial region 222, the heated transparent regions and the retardation regions 226 can be accurately aligned to the pixels of the display module 100, so that a moire phenomenon of the stereoscopic display device is effectively mitigated, and the image quality of the stereoscopic display device is improved.

In the manufacturing system 300 of the stereoscopic display module according to this embodiment, since the alignment devices are configured to align the display module 100 and the heating device 310, the first retardation film 220 can be patterned after being attached to the display module 100, so that the alignment of the display module 100 and the patterned retardation film 220a can be more accurate, and the display quality of the stereoscopic display module 200 is improved.

Figure 3:
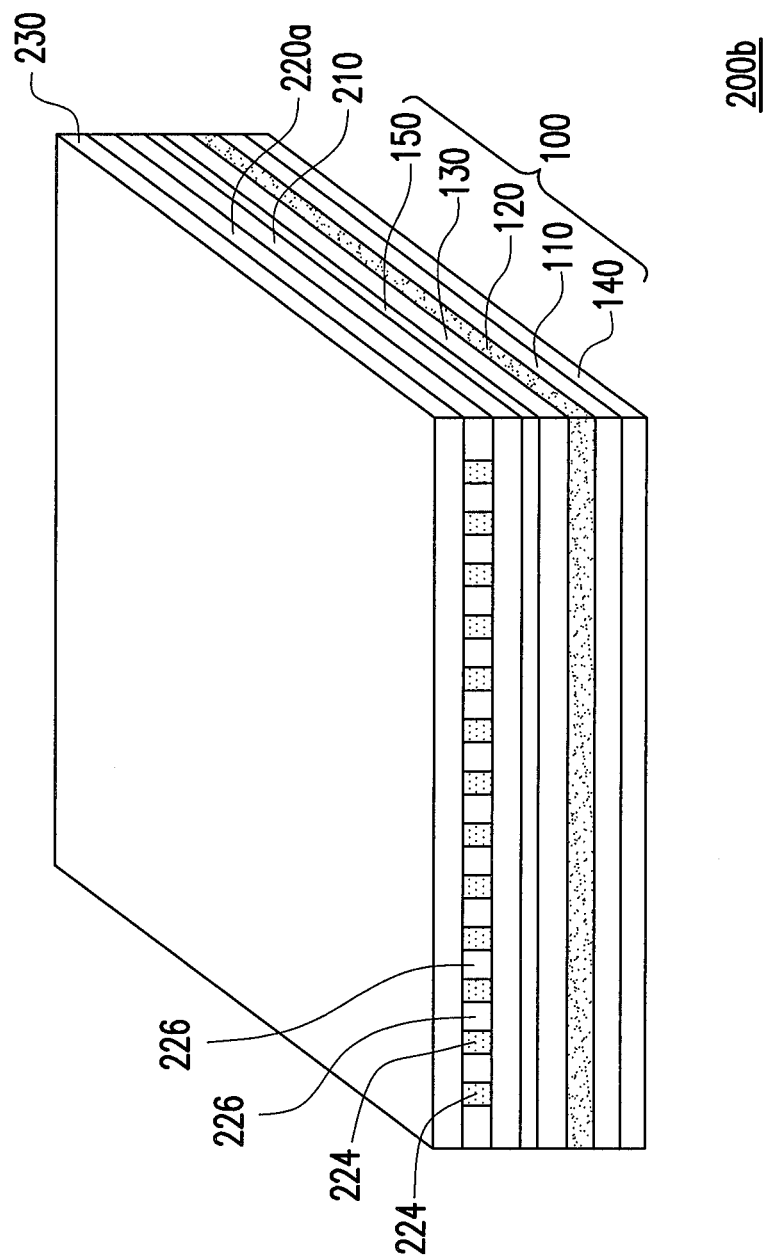
FIG. 3 is a schematic diagram of one of steps of a method for manufacturing a stereoscopic display module according to an exemplary embodiment.

FIG. 3 is a schematic diagram of one of steps of a method for manufacturing a stereoscopic display module according to an exemplary embodiment. Referring to FIG. 3, in the present embodiment, after the partial region 222 of the first retardation film 220 is heated to form the patterned retardation film 220a, i.e. after the step of FIG. 1D, a protection layer 230 is attached on the first retardation film 220, i.e. the protection layer 230 is attached on the patterned retardation film 220a, where the protection layer 230 can be use to protect the patterned retardation film 220a. In the present embodiment, the protection layer 230 comprises at least one of a hard coating film, an anti-reflective film, an anti-glare film, an anti-smudge film and an anti-fingerprint film. In this way, the stereoscopic display module 200b of FIG. 3 is manufactured.

Figure 4:
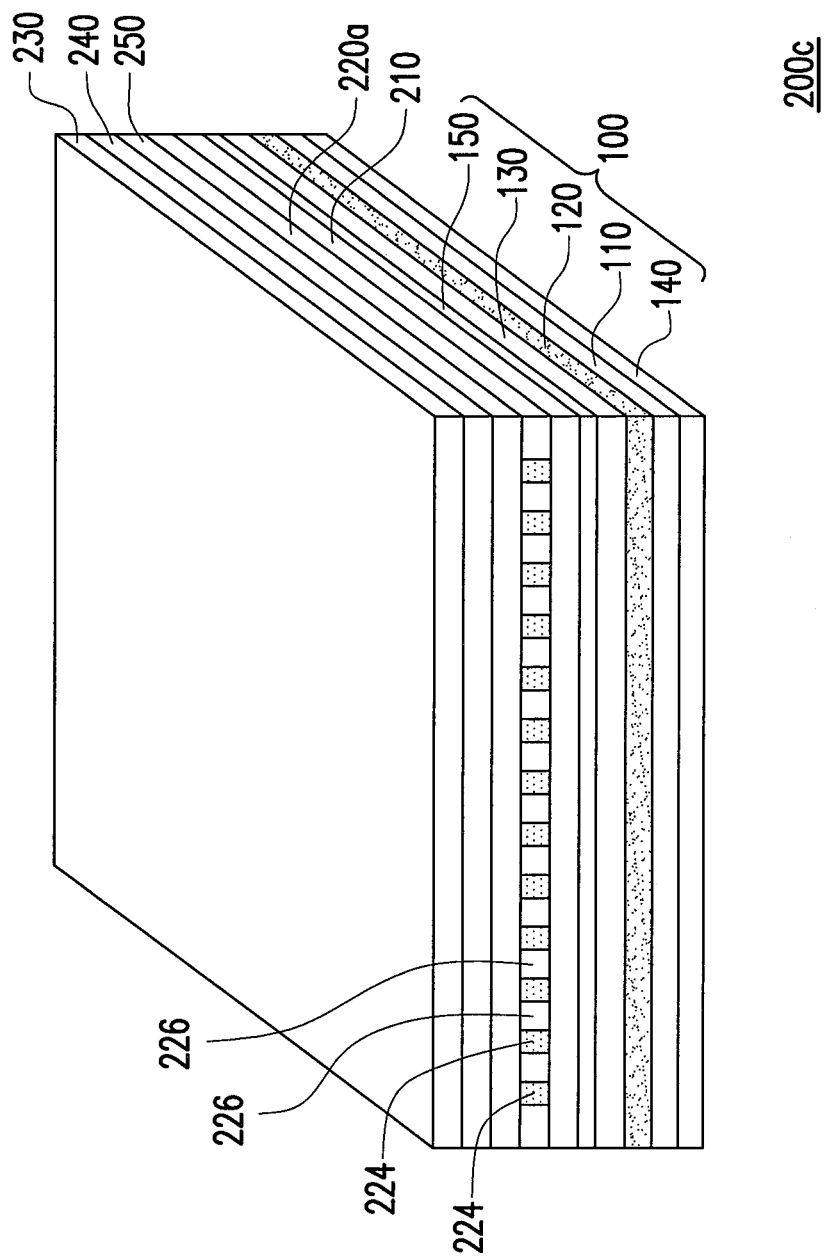
FIG. 4 is a schematic diagram of one of steps of a method for manufacturing a stereoscopic display module according to an exemplary embodiment.

FIG. 4 is a schematic diagram of one of steps of a method for manufacturing a stereoscopic display module according to an exemplary embodiment. Referring to FIG. 4, in the present embodiment, after the partial region 222 of the first retardation film 220 is heated to form the patterned retardation film 220a, i.e. after the step of FIG. 1D, a second retardation film 240 can be attached on the first retardation film 220, i.e. the second retardation film 240 is attached on the patterned retardation film 220a. In the present embodiment, the second retardation film 240 is attached on the patterned retardation film 220a with an adhesive layer 250. Then, the protection layer 230 as that of FIG. 3 is formed on the second retardation film 240 to protect the second retardation film 240. In this way, the stereoscopic display module 200c of FIG. 4 is manufactured.

The second retardation film 240 is, for example, a quarter-wavelength retardation film, i.e. a quarter wave plate. In the present embodiment, after the light from the display module 100 passes through the patterned retardation film 220a, lights of two polarization directions perpendicular to each other are generated, and after passing through the quarter-wavelength retardation film, the lights of two polarization directions perpendicular to each other are respectively transformed to circular polarized lights with different polarization directions, for example, left-handed circular polarization and right-handed circular polarization. In this way, the two lenses of the polarization glasses worn by the user can be a left-handed circular polarizer and a right-handed circular polarizer, and the left eye and the right eye of the user can respectively view two different images, so as to produce the stereoscopic image in the brain. Since the stereoscopic display module 200 of FIG. 1D generates lights of two polarization directions perpendicular to each other to respectively carry different images, when the user wears two linear polarized lenses with transmission axes perpendicular to each other and skews his head, a filtering effect of the linear polarized lenses is poor, which may cause a severe cross-talk phenomenon of the viewed stereoscopic images. Comparatively, since the stereoscopic display module 200c of FIG. 4 generates lights with two circular polarization directions, regardless of a inclined angle of the user wearing the two circular polarized lenses with different polarization directions, a same filtering effect of the circular polarized light is obtained, so that even if the user's head skews, the user can still view clear stereoscopic images. In this way, a degree of comfort for viewing the images is improved.

Figure 5:
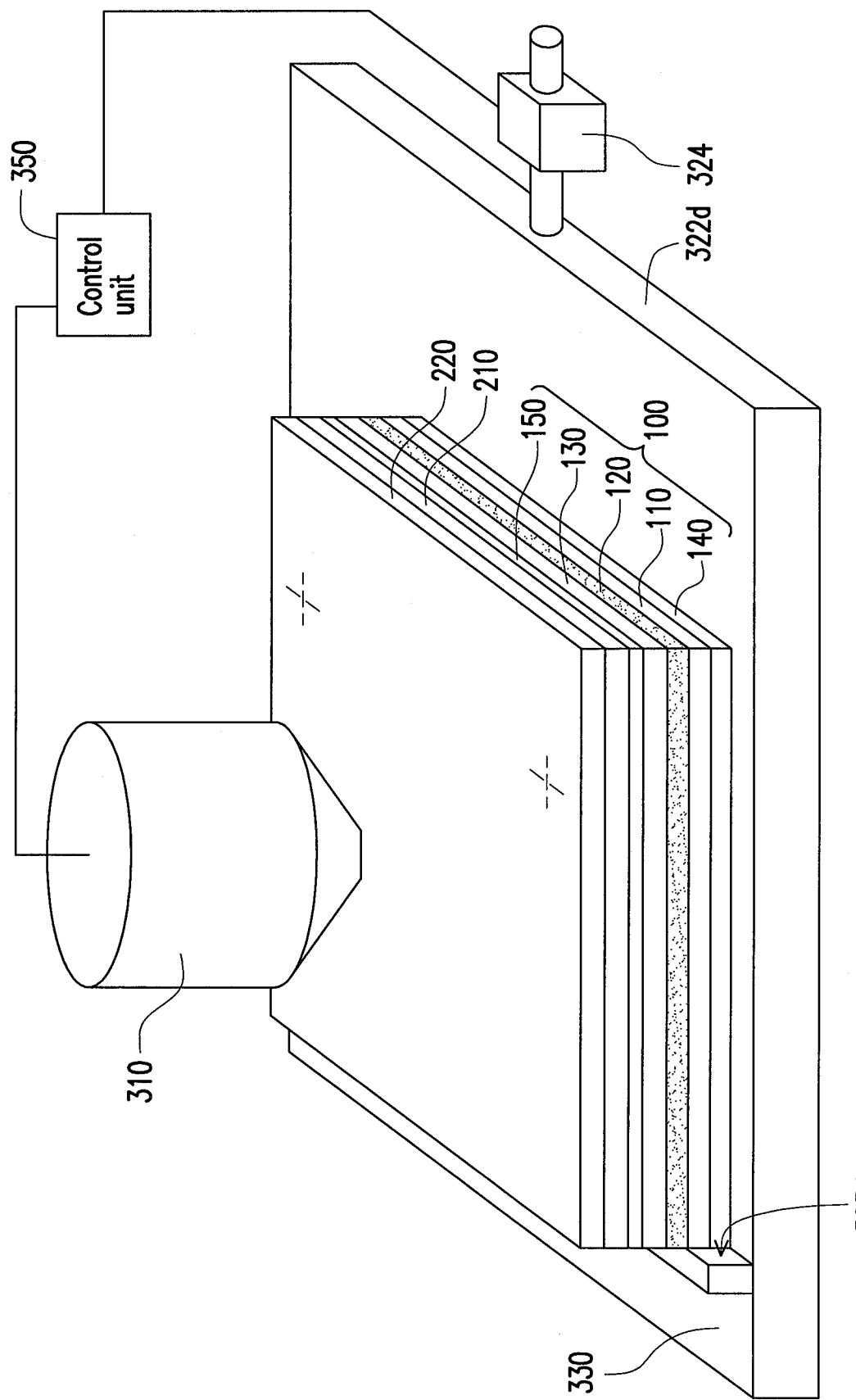
FIG. 5 is a schematic diagram of one of steps of a method for manufacturing a stereoscopic display module according to another exemplary embodiment.

FIG. 5 is a schematic diagram of one of steps of a method for manufacturing a stereoscopic display module according to another exemplary embodiment. Referring to FIG. 5, the method for manufacturing the stereoscopic display module of the present embodiment is similar to the method for manufacturing the stereoscopic display module of FIG. 2, and a difference there between is as follows. In the present embodiment, the image sensors 340 of FIG. 2 are not used for alignment, instead, aligning the display module 100 and the heating device 310 comprises leaning the display module 100 against a precision surface 323d of a carrier platform 322d. When the display module 100 precisely leans against the precision surface 323d, alignment of the display module 100 and the heating device 310 is completed, and this is because that the precision surface 323d and the carrier platform 322d are already aligned to the heating device 310 in the system, so that as long as the display module 100 is aligned to the precision surface 323d, alignment of the display module 100 and the heating device 310 is completed. In other words, the alignment device of the present embodiment is the precision surface 323d on the displacement control carrier platform 320.

In summary, in the method for manufacturing the stereoscopic display module according to the embodiments of the disclosure, since the first retardation film is first attached on the display module, and then it is heated for patterning, the transparent regions and the retardations regions of the patterned retardation film fabricated from the first retardation film can be self-aligned to the pixels of the display module, so that the display quality of the stereoscopic display module is improved, and the method for manufacturing the stereoscopic display module is simplified. Since the stereoscopic display module according to the embodiments of the disclosure has the heat-resisting adhesive layer, the structure of the display module in the stereoscopic display module is not spoiled when the retardation film is heated, so that the display quality of the stereoscopic display module is improved. In the manufacturing system of the stereoscopic display module according to the embodiments of the disclosure, since the alignment devices are configured to align the display module and the heating device, the first retardation film can be patterned after being attached to the display module, so that the alignment of the display module and the patterned retardation film can be more accurate, and the display quality of the stereoscopic display module is improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for manufacturing a stereoscopic display module, comprising:
providing a display module;
attaching a first retardation film on the display module with a heat-resisting adhesive layer; and
heating a partial region of the first retardation film to vanish a phase retardation property of the partial region after attaching the first retardation film on the display module with the heat-resisting adhesive layer, wherein the partial region comprises a plurality of sub-regions spaced at intervals.

2. The method for manufacturing the stereoscopic display module as claimed in claim 1, wherein heating the partial region of the first retardation film comprises heating the partial region with a laser beam, hot embossing the partial region, or heating the partial region with a heating wire.

3. The method for manufacturing the stereoscopic display module as claimed in claim 1, wherein before heating the partial region of the first retardation film and after attaching the first retardation film on the display module with the heat-resisting adhesive layer, the method further comprises:
aligning the display module and a heating device, wherein the heating device is configured to heat the partial region.

4. The method for manufacturing the stereoscopic display module as claimed in claim 3, wherein aligning the display module and the heating device comprises:
providing a light source to light the display module; and
positioning the display module by at least one image sensor.

5. The method for manufacturing the stereoscopic display module as claimed in claim 4, further comprising:
positioning at least two locations on the display module by the image sensor.

6. The method for manufacturing the stereoscopic display module as claimed in claim 5, wherein before aligning the display module and the heating device and after attaching the first retardation film on the display module with the heat-resisting adhesive layer, the method further comprises:
roughly fixing the display module on a displacement control carrier platform.

7. The method for manufacturing the stereoscopic display module as claimed in claim 6, wherein aligning the display module and the heating device comprises:
feeding back a signal generated by the image sensor to the displacement control carrier platform, so that the displacement control carrier platform moves according to the signals to align the display module and the heating device.

8. The method for manufacturing the stereoscopic display module as claimed in claim 3, wherein aligning the display module and the heating device comprises:
leaning the display module against a precision surface of a carrier platform.

9. The method for manufacturing the stereoscopic display module as claimed in claim 3, wherein aligning the display module and the heating device comprises:

aligning the display module and the heating device according to an alignment mark on the display module.

10. The method for manufacturing the stereoscopic display module as claimed in claim 1, wherein the first retardation film is a half-wavelength retardation film.

11. The method for manufacturing the stereoscopic display module as claimed in claim 1, wherein the display module is a liquid crystal display panel.

12. The method for manufacturing the stereoscopic display module as claimed in claim 1, wherein the sub-regions present stripe shapes.

13. The method for manufacturing the stereoscopic display module as claimed in claim 1, further comprising:
   attaching a protection layer on the first retardation film after heating the partial region of the first retardation film.

14. The method for manufacturing the stereoscopic display module as claimed in claim 13, wherein the protection layer comprises at least one of a hard coating film, an anti-reflective film, an anti-glare film, an anti-smudge film and an anti-fingerprint film.

15. The method for manufacturing the stereoscopic display module as claimed in claim 1, further comprising:
   attaching a second retardation film on the first retardation film after heating the partial region of the first retardation film.

16. The method for manufacturing the stereoscopic display module as claimed in claim 15, wherein the second retardation film is a quarter-wavelength retardation film.

17. The method for manufacturing the stereoscopic display module as claimed in claim 1, wherein a thickness of the heat-resisting adhesive layer is greater than 30 µm.

18. The method for manufacturing the stereoscopic display module as claimed in claim 1, wherein a heat-resisting temperature of the heat-resisting adhesive layer is greater than or equal to 80 degrees centigrade.

19. The method for manufacturing the stereoscopic display module as claimed in claim 1, wherein the display module comprises a first substrate, a liquid crystal layer, a second substrate, a first polarizing film and a second polarizing film, the first substrate is an active matrix substrate, the liquid crystal layer is disposed between the first substrate and the second substrate, the first substrate is disposed between the first polarizing film and the liquid crystal layer, and the second substrate is disposed between the second polarizing film and the liquid crystal layer, and attaching the first retardation film on the display module with the heat-resisting adhesive layer comprises attaching the first retardation film on the second polarizing film with the heat-resisting adhesive layer.

20. The method for manufacturing the stereoscopic display module as claimed in claim 1, wherein the display module comprises a first substrate, a liquid crystal layer, a second substrate, a first polarizing film and a second polarizing film, the first substrate is an active matrix substrate, the liquid crystal layer is disposed between the first substrate and the second substrate, the first substrate is disposed between the first polarizing film and the liquid crystal layer, and the second substrate is disposed between the second polarizing film and the liquid crystal layer, and attaching the first retardation film on the display module with the heat-resisting adhesive layer comprises attaching the first retardation film on the first polarizing film with the heat-resisting adhesive layer.

21. A stereoscopic display module, comprising:
   a display module;
   a patterned retardation film, disposed on the display module, wherein the patterned retardation film comprises a plurality of retardation regions and a plurality of transparent regions, and the retardation regions and the transparent regions are disposed in alternation; and
   a heat-resisting adhesive layer, disposed between the display module and the patterned retardation film for attaching the patterned retardation film on the display module.

22. The stereoscopic display module as claimed in claim 21, further comprising a protection layer disposed on the patterned retardation film.

23. The stereoscopic display module as claimed in claim 22, wherein the protection layer comprises at least one of a hard coating film, an anti-reflective film, an anti-glare film, an anti-smudge film and an anti-fingerprint film.

24. The stereoscopic display module as claimed in claim 21, further comprising a retardation film disposed on the patterned retardation film.

25. The stereoscopic display module as claimed in claim 24, wherein the retardation film disposed on the patterned retardation film is a quarter-wavelength retardation film.

26. The stereoscopic display module as claimed in claim 21, wherein the retardation regions of the patterned retardation film are half-wavelength retardation regions.

27. The stereoscopic display module as claimed in claim 21, wherein a thickness of the heat-resisting adhesive layer is greater than 30 µm.

28. The stereoscopic display module as claimed in claim 21, wherein a heat-resisting temperature of the heat-resisting adhesive layer is greater than or equal to 80 degrees centigrade.

29. The stereoscopic display module as claimed in claim 21, wherein the display module is a liquid crystal display panel.

30. The stereoscopic display module as claimed in claim 21, wherein the display module comprises an first substrate, a liquid crystal layer, a second substrate, a first polarizing film and a second polarizing film, the first substrate is an active matrix substrate, the liquid crystal layer is disposed between the first substrate and the second substrate, the first substrate is disposed between the first polarizing film and the liquid crystal layer, the second substrate is disposed between the second polarizing film and the liquid crystal layer, and the patterned retardation film is attached on the second polarizing film with the heat-resisting adhesive layer.

31. The stereoscopic display module as claimed in claim 21, wherein the display module comprises a first substrate, a liquid crystal layer, a second substrate, a first polarizing film and a second polarizing film, the first substrate is an active matrix substrate, the liquid crystal layer is disposed between the first substrate and the second substrate, the first substrate is disposed between the first polarizing film and the liquid crystal layer, the second substrate is disposed between the second polarizing film and the liquid crystal layer, and the patterned retardation film is attached on the first polarizing film with the heat-resisting adhesive layer.

32. A manufacturing system of a stereoscopic display module, adapted to manufacture a display module into the stereoscopic display module, the manufacturing system of the stereoscopic display module comprises:
   a displacement control carrier platform, carrying and moving the display module;
   a heating device, heating a retardation film attached on the display module;
   an alignment device, aligning the display module and the heating device; and
   a control unit, controlling a relative position of the displacement control carrier platform and the heating device to cause the heating device to heat a partial region of the retardation film, wherein the partial region comprises a plurality of sub-regions spaced at intervals.

33. The manufacturing system of the stereoscopic display module as claimed in claim 32, wherein the heating device is a laser generator, a heating wire or a hot embossing device.

34. The manufacturing system of the stereoscopic display module as claimed in claim 32, wherein the alignment device comprises an image sensor for sensing a pixel image of the display module.

35. The manufacturing system of the stereoscopic display module as claimed in claim 34, wherein the control unit moves the displacement control carrier platform according to an image signal transmitted by the image sensor.

36. The manufacturing system of the stereoscopic display module as claimed in claim 34, wherein the display module has at least one alignment mark, and the image sensor senses the alignment mark.

37. The manufacturing system of the stereoscopic display module as claimed in claim 32, wherein the alignment device is a precision surface on the displacement control carrier platform, and alignment of the display module and the heating device is completed when the display module leans against the precision surface.

\* \* \* \* \*